(12) United States Patent
Bashandy et al.

(10) Patent No.: US 9,143,395 B2
(45) Date of Patent: Sep. 22, 2015

(54) SCALABLE BGP PROTECTION FROM EDGE NODE FAILURE USING CONTEXT LABELS IN DATA PACKETS IDENTIFYING BACKUP ROUTER MIRROR TABLE

(71) Applicant: Cisco Technology, Inc., San Jose, CA (US)

(72) Inventors: Ahmed R Bashandy, Milpitas, CA (US); Clarence Filsfils, Brussels (BE); Eric C. Rosen, Arlington, MA (US); Maciej Konstantynowicz, Haddenham (GB)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 13/935,649

(22) Filed: Jul. 5, 2013

(65) Prior Publication Data
US 2015/0009806 A1 Jan. 8, 2015

(51) Int. Cl.
*H04L 12/24* (2006.01)
*H04L 12/741* (2013.01)

(52) U.S. Cl.
CPC ............ *H04L 41/0654* (2013.01); *H04L 45/74* (2013.01)

(58) Field of Classification Search
CPC .......................... H04L 41/0654; H04L 45/74
See application file for complete search history.

(56) References Cited

U.S. PATENT DOCUMENTS

| | | | |
|---|---|---|---|
| 7,813,265 B2 * | 10/2010 | Patel et al. | 370/217 |
| 2006/0153067 A1 * | 7/2006 | Vasseur et al. | 370/217 |
| 2007/0091796 A1 * | 4/2007 | Filsfils et al. | 370/228 |
| 2013/0343176 A1 * | 12/2013 | Bashandy | 370/219 |
| 2014/0286155 A1 * | 9/2014 | Bashandy | 370/221 |
| 2015/0009803 A1 * | 1/2015 | Bashandy et al. | 370/219 |

OTHER PUBLICATIONS

Filsfils et al., "LFA applicability in SP networks", [online], Mar. 1, 2010, [retrieved on Aug. 29, 2011]. Network Working Group, Internet-Draft, <draft-filsfils-rtgwg-lfa-applicability-00>. Retrieved from the Internet: <URL: http://tools.ietf.org/html/draft-filsfils-rtgwg-lfa-applicability-00>, pp. 1-28.

MPLS-Tag DocWiki, "MPLS/Tag Switching", [online], Oct. 10, 2010, [retrieved on Jul. 13, 2012]. Retrieved from the Internet: <URL: http://docwiki.cisco.com/wiki/MPLS/Tag_Switching>, pp. 1-10.

(Continued)

*Primary Examiner* — Albert T Chou
(74) *Attorney, Agent, or Firm* — Leon R. Turkevich (57) ABSTRACT

In one embodiment, a method comprises detecting, by a first provider edge router, a second provider edge router providing reachability to a prescribed destination address prefix via a protected next hop address; allocating, by the first provider edge router, a mirror forwarding table associated with the second provider edge router and identifying a destination used by the second provider edge router for reaching the prescribed destination address prefix; and the first provider edge router sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the first provider edge router to identify the destination in the rerouted data packet for delivery to the destination address prefix.

20 Claims, 6 Drawing Sheets

(56) References Cited

OTHER PUBLICATIONS

Rosen et al., "Multiprotocol Label Switching Architecture", Network Working Group, Request for Comments: 3031, Jan. 2001, pp. 1-61.
Andersson et al., "LDP Specification", Network Working Group, Request for Comments: 3036, Jan. 2001, pp. 1-132.
Andersson et al., "LDP Specification", Network Working Group, Request for Comments: 5036, Oct. 2007, pp. 1-135.
Atlas, Ed., "Basic Specification for IP Fast Reroute: Loop-Free Alternates", Network Working Group, Request for Comments: 5286, Sep. 2008, pp. 1-31.
Bashandy et al., "BGP FRR Protection against Edge Node Failure Using Table Mirroring with Context Labels", Network Working Group, Internet Draft, <draft-bashandy-bgp-frr-mirror-table-00>, Oct. 8, 2012, pp. 1-25.
Jeganathan et al., "2547 egress PE Fast Failure Protection", [online], Oct. 25, 2011, [retrieved on Jun. 12, 2013]. Network Working Group, Internet Draft, <draft-minto-2547-egress-node-fast-protection-00>, Retrieved from the Internet: <URL: http://tools.ietf.org/pdf/draft-minto-2547-egress-node-fast-protection-00.pdf>, pp. 1-13.
Bashandy et al., "BGP FRR Protection against Edge Node Failure Using Vector Labels", Jul. 7, 2012, Network Working Group, Internet Draft, <draft-bashandy-bgp-frr-vector-label-00.txt>, pp. 1-32.

* cited by examiner

SCALABLE BGP PROTECTION FROM EDGE NODE FAILURE USING CONTEXT LABELS IN DATA PACKETS IDENTIFYING BACKUP ROUTER MIRROR TABLE

TECHNICAL FIELD

The present disclosure generally relates to recovery from failure of edge routers that utilize border gateway protocol (BGP) for tunneling data traffic across a BGP-free core network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wide area networks are composed of edge routers that provide connections for a multi-homed network to a destination network via a core network, also referred to as a backbone network. Since the core network must be composed of core routers that must be able to perform the fastest possible switching operations for extremely large amounts of data traffic, the core routers often are implemented using BGP-free core routers: unlike edge routers that utilize BGP for tunneling data traffic across a core network to destination networks, BGP-free core routers do not employ BGP protocol and therefore do not need to learn about the millions of Internet protocol (IP) address prefixes that may be utilized by the edge routers.

However, if an edge router encounters a failure, there is a need to restore traffic within a guaranteed fifty (50) millisecond interval by retunnelling packets to another edge router that advertised the destination IP address prefix, without the necessity of BGP reconvergence by the edge routers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises detecting, by a first provider edge router, a second provider edge router providing reachability to a prescribed destination address prefix via a protected next hop address; allocating, by the first provider edge router, a mirror forwarding table associated with the second provider edge router and identifying a destination used by the second provider edge router for reaching the prescribed destination address prefix; and the first provider edge router sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the first provider edge router to identify the destination in the rerouted data packet for delivery to the destination address prefix.

In another embodiment, logic is encoded in one or more non-transitory tangible media for execution by a machine, and when executed is operable for: detecting, by the machine as a first provider edge router, a second provider edge router providing reachability to a prescribed destination address prefix via a protected next hop address; allocating a mirror forwarding table associated with the second provider edge router and identifying a destination used by the second provider edge router for reaching the prescribed destination address prefix; and sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the first provider edge router to identify the destination in the rerouted data packet for delivery to the destination address prefix.

In another embodiment, an apparatus comprises a network interface circuit, a memory circuit, and a processor circuit. The network interface circuit is configured for receiving an advertisement from a second provider edge router providing reachability to a prescribed destination address prefix via a protected next hop address. The memory circuit is configured for storing mirror tables for respective provider edge routers. The processor circuit is configured for allocating, in the memory circuit, a mirror forwarding table associated with the second provider edge router and identifying a destination used by the second provider edge router for reaching the prescribed destination address prefix. The processor circuit further is configured for sending repair information to a Border Gateway Protocol (BGP)-free core network router in the core network. The repair information enables the BGP-free core network router to add a context label and reroute a received data packet to the first provider edge router if the second provider edge router is unavailable, the context label enabling the processor circuit to identify the destination in the rerouted data packet for delivery to the destination address prefix.

DETAILED DESCRIPTION

Particular embodiments enable a core router in a BGP-free core network to serve as a repairing core router (rP) providing connectivity between provider edge routers (PEs) that utilize BGP to tunnel traffic across the BGP-free core network.

Figure 1:
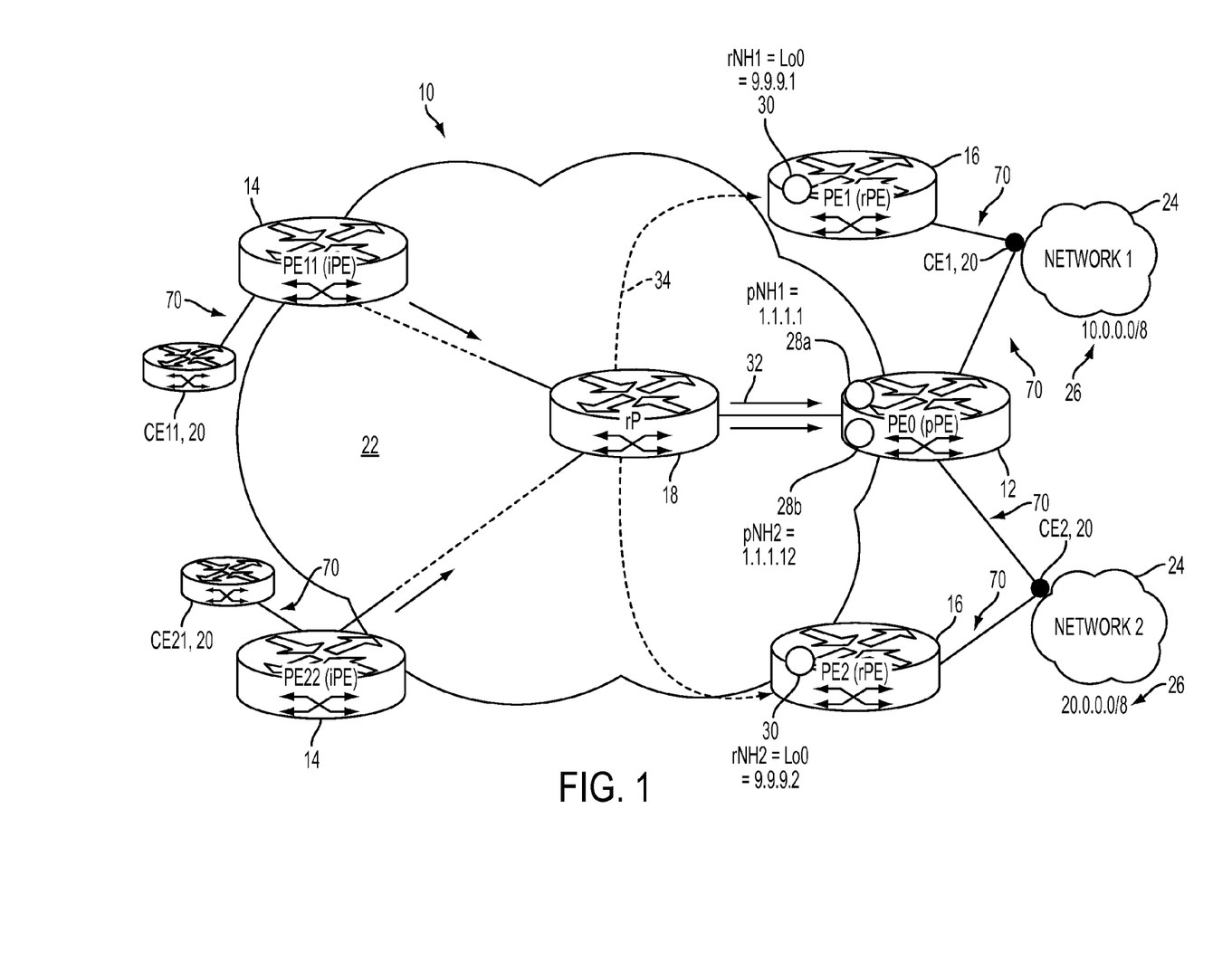
FIG. 1 illustrates an example system having an apparatus for sending repair information to a BGP-free core router of a core network to enable rerouting of data packets by the BGP-free core router, according to an example embodiment.

FIG. 1 is a diagram illustrating an example network 10 having one or more protected Provider Edge (pPE) routers 12, one or more ingress Provider Edge (iPE) routers 14, one or more repair Provider Edge (rPE) routers 16, and one or more BGP-free core network routers 18 serving as repair routers (rP), according to an example embodiment. The repair Provider Edge (rPE) routers 16 also are referred to herein as "backup provider edge routers" to reduce confusion with the repair routers (rP) 18. The BGP-free core network router 18 serves as a repairing core router that reroutes data traffic to a backup provider edge (rPE) router 16 if a protected Provider Edge (pPE) router 12 is unavailable. The BGP-free core network router 18 is part of a BGP-free core network 22 that does not utilize BGP protocol, but serves as a "backbone" network for edge routers 12, 14, and 16 that tunnel traffic to each other using the core network 22.

The provider edge routers 12, 14, and 16 serve as next-hop routers into and out of the core network 22 for customer edge (CE) routers 20 that are reachable via external routers 70 (i.e., external to the BGP-free core network 22): each customer edge (CE) router 20 can be positioned at the edge of an associated external network 24 having one or more globally-distinct IPv4 and/or IPv6 address prefixes 26. Each external network 24 is a distinct Autonomous System (AS).

The protected provider edge (pPE) router 12 can output labels for reaching destination address prefixes 26 according to BGP. In particular, the protected PE router (pPE) 12 can advertise, according to BGP protocol, each destination prefix 26 that is reachable via an external path 70 outside the core network 22; for example, the protected PE router (pPE) 12 can advertise the address prefix "10.0.0.0/8" is reachable via a BGP next hop address (bgpNH), illustrated as the protected next hop address "pNH1=1.1.1.1" 28a, and the address prefix "20.0.0.0/8" is reachable via the protected next hop address "pNH2=1.1.1.12" 28b. The protected PE router (pPE) 12 also can advertise labels according to label distribution protocol (LDP) for reaching the destination prefixes 26. Hence, ingress provider edge (iPE) routers 14 can tunnel data traffic toward the protected Provider Edge (pPE) router the 12 via the core network 22 based on inserting ("pushing") labels (86, 88 of FIG. 5) into each data packet (98 of FIG. 5), implemented for example as Label Distribution Protocol (LDP) labels based on multiprotocol label switching (MPLS).

Moreover, the backup PE routers 16 can output repair information that enables the BGP-free core router 18 to reroute a received data packet (98 of FIG. 5) to a backup PE router (e.g., "PE1") if the protected PE router (pPE) "PE0" 12 is unavailable. In particular, mirrored forwarding tables (e.g., 100 of FIG. 6) can be created based on the reachability and/or label advertisements output by protected PE router (pPE) "PE0" 12 for reaching the destination address prefixes "10.0.0.0/8" 26 and "20.0.0.0/8" 26. Each backup PE router (e.g., PE1, PE2) 16 can allocate a context label (84 of FIG. 5) (e.g., a 20-bit standard MPLS label) that identifies a mirrored forwarding table (100 of FIG. 6) that identifies the destinations (102 of FIG. 6) used by the protected PE router (pPE) 12 for reaching the destination prefix 26.

In one embodiment, each backup PE 16 can create a mirrored forwarding table (100 of FIG. 6) for each and every protected PE router (pPE) 12 that shares a destination address prefix 26 with the backup PE 16, based on the address prefix and destination advertisements by the protected PE router (pPE) 12. For example, the backup PE router "PE1" 16 can build a mirrored forwarding table 100 based on the backup PE router "PE1" 16 and the protected PE router (pPE) 12 sharing reachability to the address prefix "10.0.0.0/8" 26, i.e., the backup PE router "PE1" and the protected PE router "PE0" 12 each have an external route 70 to the destination address prefix "10.0.0.0/8" 26. If the backup PE router "PE1" 16 also shared reachability to an address prefix "30.0.0.0/8" (not shown) with another iBGP peer edge router "PE3" (not shown), the backup PE router "PE1" 16 could build a separate and distinct mirrored forwarding table for the other PE router "PE3" containing destination information for reaching the identified destination address prefix "30.0.0.0/8". In other words, if the backup PE router "PE1" 16 can serve as the backup PE for ten (10) different protected PE routers 12, the backup PE router "PE1" 16 can build ten (10) mirrored forwarding tables 100 that minors the reachability information advertised by the respective protected PE routers 12.

Figure 6:
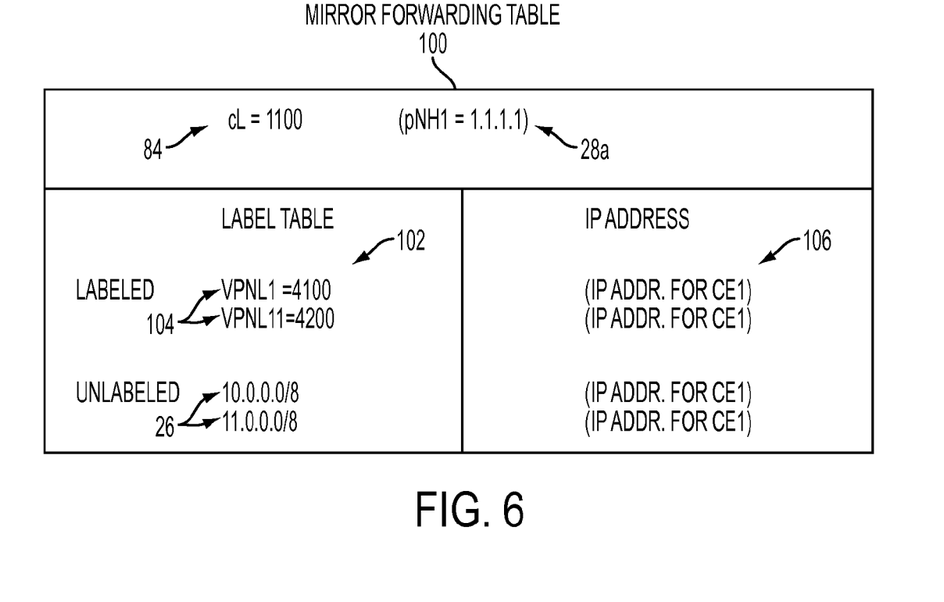
FIG. 6 illustrates an example mirrored forwarding table used by a backup provider edge router for identifying a destination in a rerouted data packet, according to an example embodiment.

Hence, the backup PE router "PE1" 16 can allocate, for each protected PE router 12 that shares reachability to a destination address prefix 12, a corresponding context label (cL) 84 that identifies the corresponding minor forwarding table 100 for the corresponding protected PE router 12. Hence, the mirror forwarding table 100 contains the label context for the prefix(es) 26 that can be reached by both the backup PE router (e.g., "PE1") 16 and the protected PE (pPE) router 12. Consequently, the context label (cL) 84 identifies the mirror table 100 associated with the protected PE router "PE0" 12. In an alternate embodiment, backup PE router 16 can allocate a context label (cL) 84 for a minor table associated with the protected PE "PE0" and that is built by another distinct entity (e.g., a network administrator).

The backup PE (e.g., "PE1") 16 can send repair information to the BGP-free core network router 18 that enables the BGP-free core network router 18 to add the context label 84, and reroute the received data packet (98 of FIG. 5) to the backup PE (e.g., "PE1") 16 if the primary PE (pPE) "PE0" 12 is not available. The context label (84 in FIG. 5) in the rerouted data packet (114 of FIG. 5) enables the backup PE router (e.g., "PE1") 16 to access the appropriate mirror forwarding table 100 to identify the destination specified in the rerouted data packet, for delivery to the destination address prefix 26 in the external network 24. In one embodiment, the destination in the rerouted data packet 114 can be expressed as a label (88 of FIG. 5) used by the protected PE (pPE) 12 for reaching the destination address prefix 26; in another embodiment, the destination can be expressed as an unlabeled destination address 90 that corresponds to a destination address prefix 26 specified in the minor forwarding table. Hence, the context label 84 enables the backup PE 16 to access the minor forwarding table associated with the primary PE (pPE) "PE0" 12 to identify the destination information allocated by the primary PE (pPE) "PE0" 12, for delivery of the rerouted data packet 114 to the destination address prefix 26.

Hence, the repairing core router (rP) 18 can provide instantaneous rerouting to the repair PE router (rPE) 16 for a destination address prefix 26 in response to the repairing core router 18 detecting that the protected Provider Edge (pPE) router 12 is unavailable, where the repairing core router (rP) 18 can instantaneously reroute a data packet to the repair PE router (e.g., PE1) 16 based on manipulating switching labels within the received data packet using the repair information advertised by the protected Provider Edge (pPE) router 12. Consequently, the data packet can be rerouted before BGP reconvergence among the edge routers, without the risk of the rerouted data packet encountering loops. Further, the backup router 16 can determine the correct mirror forwarding table based on the context label 84 added by the core router 18.

Hence, the example embodiments enable instantaneous rerouting of data packets to a backup router 16, without the necessity of multilabel pushing or popping by ingress PE routers 14, hence there is no need to modify any of the ingress PE routers. Further, there is no need for IP Fast Reroute (FRR) protection among core routers 18 in the core network 22, hence there is no need for protocols such as IS-IS or Open Shortest Path First (OSPF), or any need of calculating loop-free alternates, etc. Further, there is no need for configuring the core router 18 with any new label pop semantics.

Each of the routers 12, 14, 16, 18, and 20 can be referred to also as "apparatus". In particular, each router (apparatus) 12, 14, 16, 18 and 20 is a physical machine (i.e., a hardware device) configured for implementing network communications with other physical machines (e.g., customer edge (CE) routers 20) via the network 10. Hence, each apparatus 12, 14, 16, 18, and 20 is a network-enabled machine implementing network communications via the network 10.

Figure 2:
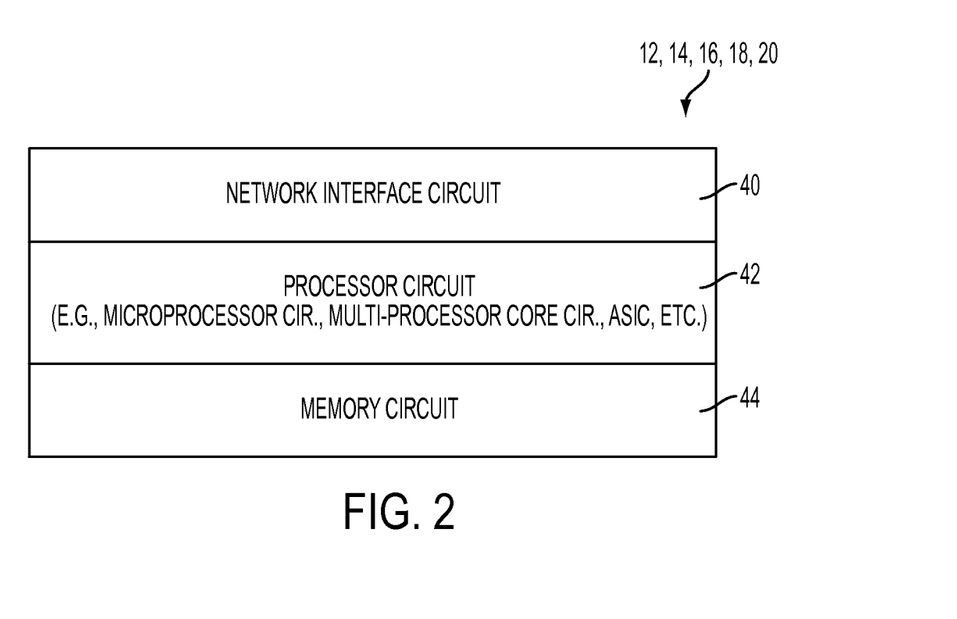
FIG. 2 illustrates an example implementation of any one of the routers of FIG. 1, according to an example embodiment.

FIG. 2 illustrates an example implementation of any one of the routers 12, 14, 16, 18, or 20 of FIG. 1, according to an example embodiment. Each of the routers 12, 14, 16, 18, or 20 can include one or more network interface circuits 40, one or more processor circuits 42, and one or more memory circuits 44.

Any of the disclosed circuits of the routers 12, 14, 16, 18, or 20 (including the network interface circuit 40, the processor circuit 42, and the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
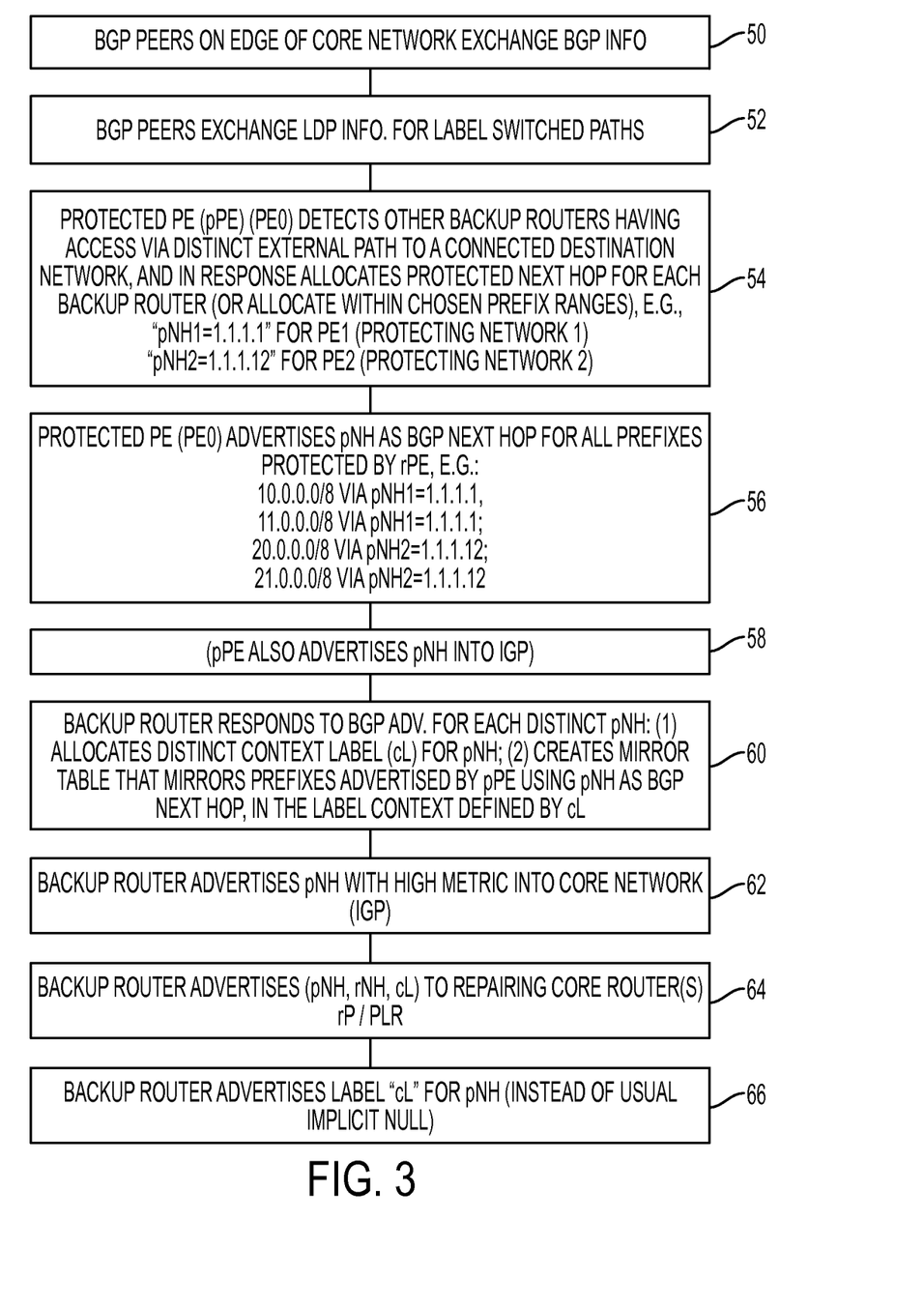
FIG. 3 illustrates an example method of an apparatus sending repair information to enable rerouting by the BGP-free core router, according to an example embodiment.

FIG. 3 summarizes a method of an apparatus sending repair information to enable a BGP-free core network router 18 to reroute a received data packet with a context label that enables a backup PE router 16 to identify a mirror forwarding table associated with a protected PE router (pPE) 12 that is unavailable, according to an example embodiment. The operations described herein with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

FIG. 3 summarizes the operations that enable the BGP-free core network router 18, also referred to as the repairing core router (rP) 18, to reroute a received data packet to a backup provider edge (rPE) router 16 via a backup path 34 if the protected Provider Edge (pPE) router 12 is unavailable via the primary path 32. In one embodiment, the routers 12 and 16 can be manually configured by a network administrator; in another embodiment, the routers 12 and 16 can be configured for automatically executing the disclosed operations.

The edge routers 12, 14, and 16 initially can exchange Internet Protocol (IP) address prefix information for destination address prefixes 26 of destination networks 24 according to BGP protocol in operation 50. As noted previously, no core router 18 utilizes BGP protocol; hence no address prefix information is stored in any core router 18. The edge routers 12, 14, and 16 in operation 52 also can initially exchange label distribution protocol (LDP) labels. For example, the protected PE (pPE) router "PE0" 12 in operation 50 can advertise that destination address prefixes 26 are reachable via a BGP next hop address (bgpNH); the protected PE (pPE) router 12 also can advertise local labels used by the protected PE (pPE) router 12, for example "VPNL1=4100" (102 in FIG. 6) for reaching the address prefix "10.0.0.0/8" 26 within the destination network "Network 1" 26.

The protected PE (pPE) router 12 in operation 54 can detect the backup routers "PE1" and "PE2" 16 that have access via distinct external paths 70 to external networks 24 that are reachable by protected PE (pPE) router 12, and in response allocate protected next hop addresses for each backup router 16. For example, the protected PE (pPE) router 12 can allocate the protected next hop address "pNH1=1.1.1.1" 28a for the backup router "PE1" protecting the prefixes for "Network 1" 24, e.g., "10.0.0.0/8" 26 and "11.0.0.0/8" (not shown in FIG. 1); the protected PE (pPE) router 12 can allocate the protected next hop address "pNH2=1.1.1.12" 28b for the backup router "PE2" protecting the prefixes for "Network 2" 24, e.g., "20.0.0.0/8" 26 and "21.0.0.0/8" (not shown in FIG. 1).

The protected PE (pPE) router 12 in operation 56 can advertise the protected next hop addresses 28 as BGP next hop addresses for all the prefixes protected by the backup routers (rPE) 16. As illustrated in FIG. 3, the protected PE (pPE) router 12 can advertise to all of its iBGP peers 14 and 16 that the address prefix "10.0.0.0/8" 26 is reachable via the protected next hop address "pNH1=1.1.1.1" 28a, the address prefix "11.0.0.0/8" 26 (used by the network "Network 1" 24) is reachable via the protected next hop address "pNH1=1.1.1.1", the address prefix "20.0.0.0/8" 26 is reachable via the protected next hop address "pNH2=1.1.1.12" 28b, and the address prefix "21.0.0.0/8" (used by the network "Network 2" 24) is reachable via the protected next hop address "pNH2=1.1.1.12" 28b. Assuming the iBGP peers 12, 14, and 16 can directly peer with each other, the routers 14 and 16 can readily determine the router ID of the advertising router "PE0" 12. If direct peering is not possible (e.g., due to the presence of a route reflector), the advertisement output by the protected PE (pPE) router 12 in operation 56 can specify a router ID attribute ("RID-attr") as an optional non-transitive attribute that specifies the router identifier of the advertising PE router (e.g., 12 or 16); hence, advertisement of the "RID-attr" with each protectable prefix 26 enables the other routers 14, 16 to identify the advertising router despite the presence of a route reflector.

The protected PE router (pPE) 12 in operation 58 also can advertise the protected next hop address (e.g., "pNH1=1.1.1.1") 28 into the core network 22 using a prescribed Interior Gateway protocol (IGP) (with an identifiable cost metric), enabling the core routers 18 to identify the protected next hop address 28 as associated with the protected PE (pPE) router 12.

In response to the network interface circuit 40 of the backup router "PE1" 16 receiving the advertisement messages advertised by the protected PE (pPE) router 12, the processor circuit 42 of the backup router "PE1" 16 can respond in operation 60 to the advertisement message for each protected next hop address 28 that specifies a destination address prefix (e.g., "10.0.0.0/8") 26 that is reachable by the backup router "PE1" 16. In one embodiment, a network administrator can "inform" the backup router 16 about the BGP next hop addresses 28a that can be rejected by the backup router 16; in another embodiment, the backup router 16 can automatically detect the router advertisements based on either the peer router ID (if the BGP routers are capable of peering), or based on the optional attribute "RID-Attr" specified in the advertisement message.

In particular, the processor circuit 42 of the backup PE "PE1" 16 in operation 60 can perform the following operations for each distinct primary next hop address 28a identified as providing reachability to a protectable address prefix 26 that is reachable by the backup PE "PE1" 16 via an external route 70. The backup router "PE1" 16 can allocate a locally distinct context label (cL) 84 for the corresponding protected next hop address, for example "cL=1100" for the protected next hop address "pNH=1.1.1.1" 28a advertised by the protected PE (pPE) router 12.

Figure 5:
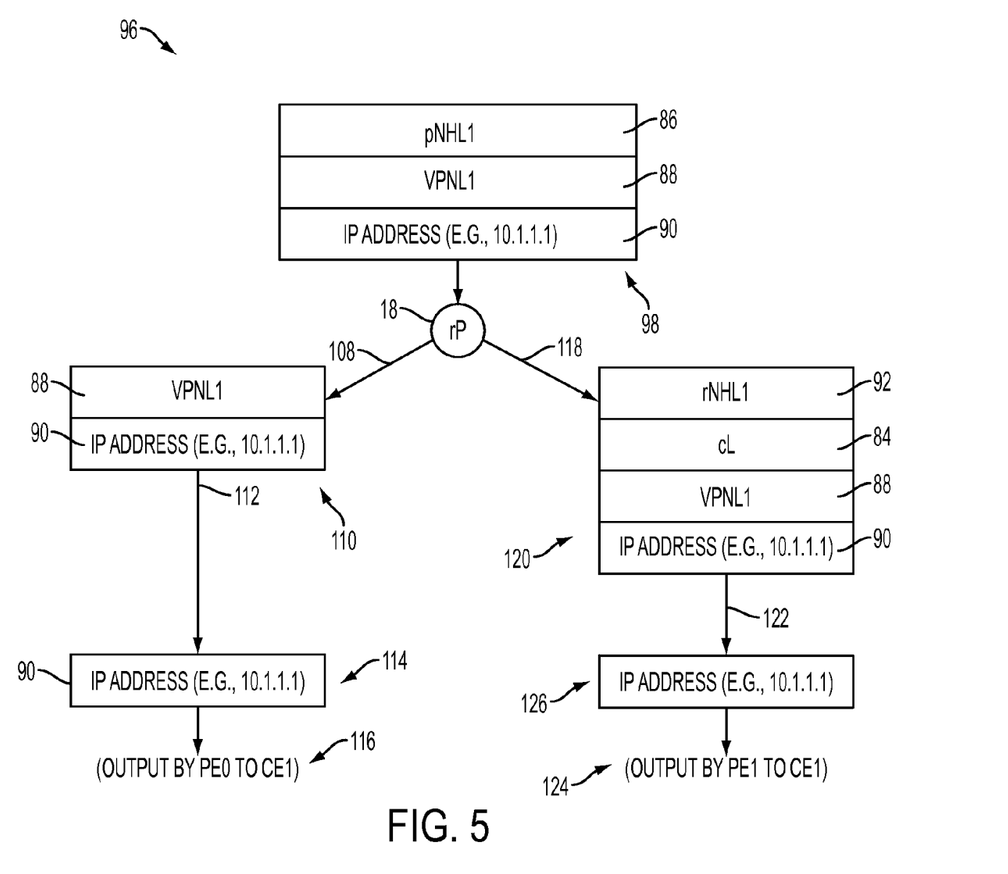
FIG. 5 illustrates example switching labels inserted into a data packet during transmission via the core network of FIG. 1, according to an example embodiment.

The context label 84 uniquely identifies a corresponding mirror forwarding table (100 of FIG. 6) that can be built by the processor circuit 42 of the backup router "PE1" 16: as illustrated in FIG. 6, the mirror forwarding table 100 can include destinations 102 advertised by the protected PE (pPE) router 12 and that enabled the backup router "PE1" 16 to identify the destinations 102 as specified in a rerouted data packet (114 of FIG. 5). If a received advertisement message specifies a labeled prefix, the processor circuit 42 of the backup router "PE1" 16 can insert the received label 104 into the mirror forwarding table 100; for example, if a received advertisement message specifies a label "VPNL1=4100" 104 for the destination address prefix "10.0.0.0/8" 26 and a label "VPNL2=4200" 104 for the destination address prefix "11.0.0.0/8" 26, the processor circuit 42 of the backup router "PE1" 16 can insert the labels "VPNL1=4100" 104 and "VPNL2=4200" 104 into the label table, along with the corresponding IP address (or local label) 106 used to resolve the labels 104 (e.g., the IP address of the consumer edge router "CE1" 20). If a received advertisement message specifies one or more unlabeled prefixes 26, the unlabeled prefixes 26 are added into the mirror forwarding table 100, along with the associated IP address used to resolve the unlabeled prefixes (e.g., the IP address of the consumer edge router "CE1" 20).

The processor circuit 42 of the backup PE "PE1" 16, in operation 62 for each corresponding protected next hop (pNH) address 28, also advertises the protected next hop (e.g., "pNH1=1.1.1.1") 28a into the core network 22 using a prescribed Interior Gateway protocol (IGP) and specifying a higher metric than the metric advertised by the protected PE (pPE) router 12 for the protected next hop 28a. Hence, since the backup PE router "PE1" 16 advertises the protected next hop (e.g., "pNH1=1.1.1.1") 28a at a higher cost than the corresponding cost advertised by the protected PE (pPE) router 12, all core routers 18 in the core network 22 will prefer to send traffic to the protected PE (pPE) router 12 when sending traffic to the IP address "pNH1=1.1.1.1" so long as the protected PE (pPE) router 12 is available. If the protected PE (pPE) router 12 is no longer available, the routers 18 in the core network 22 can begin rerouting traffic to the backup router "PE1" 16 without waiting for reconvergence according to IGP within the network 22 or BGP by the edge routers 14 and 16.

The processor circuit 42 of the backup PE "PE1" 16, in operation 64 for each corresponding protected next hop (pNH) address (e.g., "pNH1=1.1.1.1") 28a, also can allocate in operation 64 a repair next hop address "rNH1=9.9.9.1" 30 for reaching the backup PE "PE1" 16. The processor circuit 42 of the backup PE "PE1" 16 can send in operation 64, to the core router "rP" 18, repair information that associates the protected next hop address "pNH1=1,1,1,1" 28a, the repair next hop address "rNH1=9.9.9.1" 30, and the context label "cL=1100" 84 allocated by the backup PE router "PE1" 16. Hence, the triplet (pNH, rNH, cL) generated and output by the backup PE "PE1" 16 enables the core router 18 to reroute a received data packet 98 (in operation 112 in FIGS. 4 and 5) if the protected PE (pPE) router 12 is not available, described in further detail below.

The processor circuit 42 of the backup PE "PE1" 16, in operation 66 for each corresponding protected next hop (pNH) address (e.g., "pNH1=1.1.1.1") 28a, also can advertise the context label "cL" (e.g., "cL=1100) 84 for the protected next hop (pNH) address (e.g., "pNH1=1.1.1.1") 28a instead of the usual implicit "NULL" to its neighboring label switched routers. The advertisement of the context label "cL" 84 associated with the protected next hop (pNH) address 28a ensures that the label switched routers within the core network 22 can add the context label "cL" 84 to any rerouted traffic during the period starting from the availability of the protected PE (pPE) router 12 until all of the ingress PE (iPE) routers 14 stop using the protected PE (pPE) router 12 as an exit point for BGP traffic. Hence, the added context label 84 ensures that the backup PE "PE1" 16 can identify the correct mirror table 104 the packet correctly to the intended destination.

Although not described in detail previously, it will be readily apparent that the backup PE router "PE2" 16 perform similar operations as the backup PE router "PE1" 16 for the protected next hop address "pNH2=1.1.1.12" providing reachability to the address prefix "20.0.0.0/8" 26 and "21.0.0.0/8" 26 at the external network "Network 2" 24 via the repair next hop address "rNH2=9.9.9.2" 30.

Hence, the backup PE routers 16 can inject into the core network 12 a context label for a corresponding protected next hop address (pNH) 28 that is used for a specific primary-backup router pair for at least one shared address prefix (e.g., cL=1100 for pNH1 for primary PE0 and backup PE1 for "10.0.0.0/8" and "11.0.0.0/8"; cL=1200 for pNH2 for primary PE0 and backup PE2 for "20.0.0.0/8 and "21.0.0.0/8").

Figure 4:
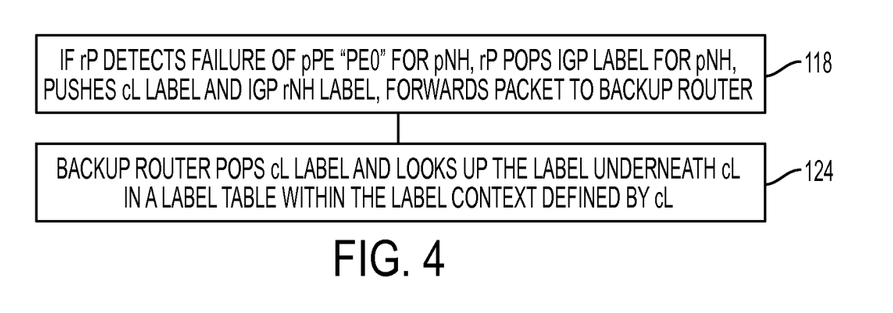
FIG. 4 illustrates example rerouting of data packets based on adding a context label, according to an example embodiment.

Referring to FIGS. 4 and 5, any core router 18 (or labels which router) that determines in operation 108 that the protected PE (pPE) router is available can pop the label 86 for reaching the protected next hop address (e.g., pNHL1 for "pNH1=1.1.1.1") using penultimate hop popping in operation 110, and output the packet for delivery to the packet in operation 112 to the protected PE router 12. The protected PE router (pPE) can pop the VPN label 88 and forward the packet 114 to the customer edge router "CE1" 20 in operation 116 based on its label table entry for the label "VPNL1" 88.

If the core router 18 determines in operation 118 of FIGS. 4 and 5 that the protected PE (pPE) router 12 is not available for the protected next hop address "pNH1=1.1.1.1" 28 as identified by its corresponding label "pNHL1" 86, the core router 18 can swap the label "pNHL1" 86 (associated with the protected next hop address "pNH1=1.1.1.1" 28) with the context label "cL=1100" 84, and adding (i.e., "pushing") the corresponding label "rNHL1" for reaching the repair next hop address "rNH1=9.9.9.1" 30 via the core network 22. The core router 18 can output the rerouted data packet 120 in operation 122 through the label switched path that terminates on the repair next hop address "rNH1=9.9.9.1" 30.

In response to the network interface circuit 40 of the backup PE router "PE1" 16 receiving the rerouted data packet 120 in operation 124 (with the label 92 popped by its penultimate hop router), the processor circuit 42 of the backup PE router "PE1" 16 can identify from the context label "cL=1100" 84 that the mirror forwarding table 100 for the protected next hop (pNH) address "pNH1=1.1.1.1" needs to be accessed to identify the destination 102, illustrated for example as the underlying label "VPNL1=4100" 88. In response to the processor circuit 42 of the backup PE router "PE1" 16 interpreting the underlying label "VPNL1=4100" 88 in the context of the mirror forwarding table 100 identified by the context label "cL=1100" 84, the processor circuit 42 of the backup PE router "PE1" 16 in operation 124 can determine that the packet 126 should be output to the IP address of the consumer edge router "CE1" 20. If unlabeled advertisements are used, the processor circuit 42 of the backup PE router "PE1" 16 can obtain from the mirror forwarding table 100 the corresponding IP address 106 for the consumer edge router "CE1" 20 providing reachability to the destination address 90 within the destination address prefix "10.0.0.0/8".

Hence, the context label enables backup PE router "PE1" 16 to identify the destination (e.g., 88, 90) in the rerouted data packet for delivery to the destination address prefix.

According to example embodiments, backup provider edge routers can allocate a context label that identifies a mirror forwarding label to identify a destination within the context of a protected provider edge router that is no longer available for delivery of a data packet via a preferred next hop address. Advertisement of the context label with at least the preferred next hop address enables any core router to insert the context label into the data packet, enabling instantaneous rerouting without reconfiguring any core router with any new label semantic rules. Moreover, the context label enables the backup provider edge router to identify the destination specified in the data packet, within the context of the protected provider edge router, for delivery of the data packet to the destination address prefix associated with the destination specified in the data packet.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a first provider edge router, a second provider edge router providing reachability to a prescribed destination address prefix via a protected next hop address;
   allocating, by the first provider edge router, a mirror forwarding table associated with the second provider edge router and identifying a destination used by the second provider edge router for reaching the prescribed destination address prefix; and
   the first provider edge router sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the first provider edge router to identify the destination in the rerouted data packet for delivery to the destination address prefix.

2. The method of claim 1, wherein the detecting is based on the second provider edge router advertising the protected next hop address as a BGP next hop for at least the destination address prefix that is reachable by the first provider edge router and the second provider edge router via distinct routes that are external to the core network.

3. The method of claim 1, wherein the repair information associates the protected next hop address, a repair next hop address allocated by the first provider edge router for reaching any destination address prefix reachable by the first provider edge router and the second provider edge router via distinct external routers, and the context label allocated by the first provider edge router.

4. The method of claim 3, wherein the repair information enables the BGP-free core network, in response to determining the second provider edge router is unavailable, to add the context label based on swapping a label for reaching the second provider edge router with the context label, and add a label for reaching the repair next hop address via the core network.

5. The method of claim 1, further comprising:
   the first provider edge router receiving the rerouted data packet from the BGP-free core network router via the core network;
   identifying the destination in the rerouted data packet based on accessing the mirror forwarding table associated with the second provider edge router in response to detecting the context label in the rerouted data packet, and accessing a table entry in the mirror forwarding table identifying the destination specified in the rerouted data packet.

6. The method of claim 1, further comprising the first provider edge router outputting an advertisement for the protected next hop address in the core network according to a prescribed interior gateway protocol, the advertisement specifying a higher cost for reaching the protected next hop address relative to any cost advertised by the second provider edge router.

7. The method of claim 6, further comprising the first provider edge router advertising the context label with the protected next hop address to label switched routers, enabling the label switched routers to add the context label to any data packet routed in response to the advertisement if the second provider edge router is unavailable.

8. One or more non-transitory tangible media encoded with logic for execution by a machine and when executed operable for:
   detecting, by the machine as a first provider edge router, a second provider edge router providing reachability to a prescribed destination address prefix via a protected next hop address;
   allocating a mirror forwarding table associated with the second provider edge router and identifying a destination used by the second provider edge router for reaching the prescribed destination address prefix; and
   sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the first provider edge router to identify the destination in the rerouted data packet for delivery to the destination address prefix.

9. The one or more non-transitory tangible media of claim 8, wherein the detecting is based on the second provider edge router advertising the protected next hop address as a BGP next hop for at least the destination address prefix that is reachable by the first provider edge router and the second provider edge router via distinct routes that are external to the core network.

10. The one or more non-transitory tangible media of claim 8, wherein the repair information associates the protected next hop address, a repair next hop address allocated by the first provider edge router for reaching any destination address prefix reachable by the first provider edge router and the second provider edge router via distinct external routers, and the context label allocated by the first provider edge router.

11. The one or more non-transitory tangible media of claim 10, wherein the repair information enables the BGP-free core network, in response to determining the second provider edge router is unavailable, to add the context label based on swapping a label for reaching the second provider edge router with the context label, and add a label for reaching the repair next hop address via the core network.

12. The one or more non-transitory tangible media of claim 8, further operable for:
   the first provider edge router receiving the rerouted data packet from the BGP-free core network router via the core network;
   identifying the destination in the rerouted data packet based on accessing the mirror forwarding table associated with the second provider edge router in response to detecting the context label in the rerouted data packet, and accessing a table entry in the mirror forwarding table identifying the destination specified in the rerouted data packet.

13. The one or more non-transitory tangible media of claim 8, further operable for the first provider edge router outputting an advertisement for the protected next hop address in the core network according to a prescribed interior gateway protocol, the advertisement specifying a higher cost for reaching the protected next hop address relative to any cost advertised by the second provider edge router.

14. The one or more non-transitory tangible media of claim 13, further operable for the first provider edge router advertising the context label with the protected next hop address to label switched routers, enabling the label switched routers to add the context label to any data packet routed in response to the advertisement if the second provider edge router is unavailable.

15. An apparatus implemented as a first provider edge router, the apparatus comprising:
   a network interface circuit configured for receiving an advertisement from a second provider edge router providing reachability to a prescribed destination address prefix via a protected next hop address;
   a memory circuit configured for storing mirror tables for respective provider edge routers; and
   a processor circuit configured for allocating, in the memory circuit, a mirror forwarding table associated with the second provider edge router and identifying a destination used by the second provider edge router for reaching the prescribed destination address prefix, the processor circuit configured for sending repair information to a Border Gateway Protocol (BGP)-free core network router in the core network, the repair information enabling the BGP-free core network router to add a context label and reroute a received data packet to the first provider edge router if the second provider edge router is unavailable, the context label enabling the processor circuit to identify the destination in the rerouted data packet for delivery to the destination address prefix.

16. The apparatus of claim 15, wherein the processor circuit is configured for detecting the second provider edge router as a protected provider edge router for the prescribed destination address prefix, based on the second provider edge router advertising the protected next hop address as a BGP next hop for at least the destination address prefix that is reachable by the first provider edge router and the second provider edge router via distinct routes that are external to the core network.

17. The apparatus of claim 15, wherein the repair information associates the protected next hop address, a repair next hop address allocated by the first provider edge router for reaching any destination address prefix reachable by the first provider edge router and the second provider edge router via distinct external routers, and the context label allocated by the first provider edge router.

18. The apparatus of claim 17, wherein the repair information enables the BGP-free core network, in response to determining the second provider edge router is unavailable, to add the context label based on swapping a label for reaching the second provider edge router with the context label, and add a label for reaching the repair next hop address via the core network.

19. The apparatus of claim 15, wherein:
   the network interface circuit is configured for receiving the rerouted data packet from the BGP-free core network router via the core network;

the processor circuit is configured for identifying the destination in the rerouted data packet based on accessing the mirror forwarding table associated with the second provider edge router in response to detecting the context label in the rerouted data packet, and accessing a table entry in the mirror forwarding table identifying the destination specified in the rerouted data packet.

20. The apparatus of claim 15, wherein the processor circuit is configured for generating and outputting an advertisement for the protected next hop address in the core network according to a prescribed interior gateway protocol, the advertisement specifying a higher cost for reaching the protected next hop address relative to any cost advertised by the second provider edge router.

* * * * *